W. N. AMSBARY & T. D. STEWART.
COMBINATION FOOD AND WATER COOLER.
APPLICATION FILED APR. 19, 1916.
1,229,011.
Patented June 5, 1917.
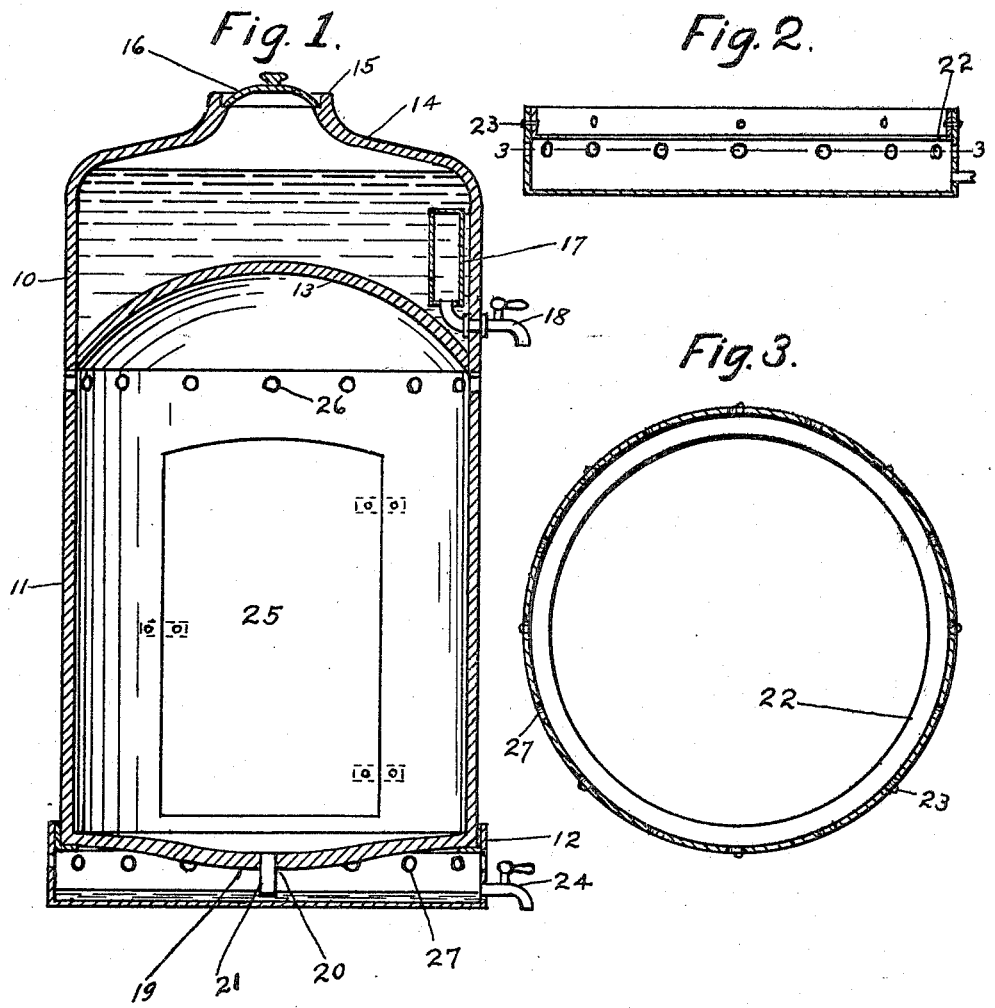
Inventors,
W. N. Amsbary
and
T. D. Stewart
by Hazard Berry & Miller
atty's.

UNITED STATES PATENT OFFICE.

WILLIAM N. AMSBARY, OF LOS ANGELES, AND THALES D. STEWART, OF OCEAN PARK, CALIFORNIA.

COMBINATION FOOD AND WATER COOLER.

1,229,011.        Specification of Letters Patent.        Patented June 5, 1917.

Application filed April 19, 1916. Serial No. 92,226.

*To all whom it may concern:*

Be it known that we, WILLIAM N. AMSBARY and THALES D. STEWART, citizens of the United States, residing at Los Angeles and Ocean Park, respectively, in the county of Los Angeles and State of California, have invented new and useful Improvements in Combination Food and Water Coolers, of which the following is a specification.

Our invention relates to a combined food and water cooler in which the cooling effect is obtained by the evaporation of water which percolates through the walls of a water receptacle formed of porous clay or unglazed earthenware.

It is an object of our invention to construct a combined food and water cooler in which the water percolates through capillary attraction through the walls of the water compartment arranged at the top of the cooling chamber. The water passes through the porous side walls of said chamber and through the bottom thereof. A portion of the water will percolate through the walls on either side thereof, and by evaporation will produce the desired cooling effect, as will be understood. The cooling chamber is supported on a pan and in spaced relation with the bottom of said chamber. A series of ventilating apertures is arranged in the side walls of the pan, whereby a current of air may flow in contact with the bottom of the cooling chamber, thereby increasing the cooling effect by the evaporation of the water percolating through said bottom. The bottom is preferably dished and provided with an aperture in the center constituting an outlet port for any excess water which may collect on the inside of the bottom. Means are provided for effecting a water seal between said aperture and the bottom of the pan, thereby preventing the escape of the cold air from the cooling chamber. A series of ventilating apertures is provided roundabout the upper part of the cooling chamber, allowing the escape of any odors therefrom, and also permitting air currents to circulate through the upper part of said chamber and assist in the evaporation of the water seeping through the porous walls. A lateral door in the cooling chamber is provided whereby access may be obtained to the interior thereof.

With the above and other objects in view which will appear as the description proceeds, our invention consists in the novel features of construction, arrangement and combination hereinafter described and claimed.

In the accompanying drawings which form a part of this specification, we have illustrated a preferred embodiment of our invention, and in which:

Figure 1 is a vertical longitudinal section of the combined food and water cooler.

Fig. 2 is a central vertical section of the supporting pan.

Fig. 3 is a horizontal section taken on line 3—3, of Fig. 2.

Our combined food and water cooler consists of a water compartment 10 arranged on top of a cooling chamber 11 which is supported on a pan 12. The water compartment and the cooling chamber are preferably cylindrical in shape and of the same diameter, and are constructed of a porous material such as porous stone or unglazed earthenware. The lateral walls of the water compartment are made integral with the lateral walls of the cooling chamber. A convex partition wall 13 between the two constitutes the bottom of the water compartment and the top of the cooling chamber. The water compartment 10 has a top 14 terminating in a central neck 15 provided with an annular shoulder on which a cover 16 is seated. The neck is made of a size sufficient to enable the introduction of the hand for cleaning the water compartment. A water filter 17 of any suitable or preferred construction is arranged within the water compartment from which a valve outlet pipe 18 leads through the lower end of the lateral wall of the water compartment. If it is desired, the filter 17 in the water compartment may be dispensed with and a separate water filter may be arranged having its outlet port connected to the neck 15 of the water compartment so that the water compartment 10 is supplied with filtered water at all times.

The cooling chamber 11 is provided with a closed bottom 19 which is preferably dished, with its lowest portion at the center, at which point an outlet port 20 is provided for draining off any excess of water which may collect coming from the lateral walls of the cooling chamber. In order to prevent the escape of the cooled air, a pipe 21 leads from the drainage port 20 to a point near the bottom of the supporting pan 12. The pan is provided with an internal circular flange 22 near the top thereof, suitably secured to the lateral walls of the pan by rivets 23 or the like. The cooling chamber is seated on said circular flange 22. A drainage outlet port 24 is provided in said supporting pan 12 draining off any water collected in said pan. A door 25 is provided in the side of the cooling chamber, giving access to the interior thereof. Near the upper end of the cooling chamber, a series of ventilating openings 26 are circumferentially arranged which serve to allow the escape of any odors in the cooling chamber and for the circulation of air currents passing horizontally through the upper part of the cooling chamber. The supporting pan 12 is likewise provided with a series of ventilating openings 27 which serve to allow the circulation of air currents in contact with the outer face of the bottom of the cooling chamber, thereby assisting in cooling the bottom of the same.

From the foregoing description, the operation of our improved combined food and water cooler will be easily understood. The water in the water compartment 10 will seep through the porous walls thereof. Such seepage will be greatest at the point of greatest pressure, which is at the bottom and adjacent to the side thereof. The water will percolate through the side walls of the cooling chamber 11 down to the bottom 19 of the same. Any excess of water collecting in the bottom of the cooling chamber will be drained off through the water sealed drainage boat 20. The cooling effect is obtained through the evaporation of the water from the surface of the porous walls. Evaporation from the inside of the walls is provided for by the series of ventilating openings 26 at the upper end of the cooling chamber, while evaporation from the outer face of the bottom is provided for by the ventilating openings 27 in the supporting pan 12.

It is thus seen that we have provided a very simple yet highly efficient food and water cooler comprising a unitary structure allowing convenient access to the interior of the water compartment and of the cooling chamber. Food may be placed within said chamber and removed therefrom through the lateral door 25 without the necessity of lifting the apparatus from its support as in the food coolers of ordinary construction. The apparatus is easily kept in a sanitary condition. The interior of the cooling chamber may be easily flushed out through the outlet port 20. It should be observed that there are no corners or places difficult of access.

While we have shown the preferred form of apparatus as now known to us, we do not desire to confine ourselves to the specific details of construction, as various changes may be made by those skilled in the art without departing from the spirit of our invention as claimed.

We claim:

1. A food cooler comprising a cylindrical chamber made of porous walls, said chamber having a convex top and a dished bottom, a chamber supporting pan, a water sealed outlet port leading from the bottom of said chamber to the bottom of said pan, a lateral door in said chamber, a series of ventilating openings circumferentially arranged near the top of said chamber, a series of ventilating openings arranged in the lateral walls of said pan and below the bottom of said chamber, a drainage port in said pan and a source of water in contact with said convex top.

2. A food cooler comprising a chamber made of porous walls, said chamber having a convex top and a dished bottom, a chamber supporting pan, an outlet port leading from said bottom to said pan, a lateral door in said chamber, a series of ventilating openings arranged near the top of said chamber and a series of ventilating openings in said pan below the bottom of said chamber and a source of water in contact with the convex top of said chamber.

3. A food cooler comprising a chamber made of porous walls, a water compartment on the top thereof and separated therefrom by the porous top of said chamber, a series of ventilating openings arranged in the top of said chamber, said chamber having a dished bottom provided with a water sealed outlet port at its lowest point, a closed chamber supporting said first named chamber and provided with ventilating passages whereby the outer face of said bottom is cooled.

4. A food cooler comprising a cooling chamber made of porous walls, a water compartment in the top thereof and separated therefrom by a porous partition wall, said chamber being provided with a series of ventilating openings and having a bottom made of porous material provided with a water sealed outlet port, a closed chamber supporting said cooling chamber and provided with ventilating passages whereby the outer face of said bottom is cooled.

5. A food cooler comprising a cooling chamber having porous side walls and a porous bottom, a water compartment arranged at the top of said chamber, a water sealed outlet port in said bottom and a support for said chamber having ventilating passages near said bottom whereby the outer face of said bottom is cooled.

In testimony whereof we have signed our names to this specification.

WILLIAM N. AMSBARY.
THALES D. STEWART.

Copies of this patent may be obtained for five cents each, by addressing the "Commissioner of Patents, Washington, D. C."